United States Patent [19]
Tsuchiya et al.

[11] 3,834,500
[45] Sept. 10, 1974

[54] DOG CLUTCH
[75] Inventors: Teruo Tsuchiya, Tokyo; Hisashi Imai; Ryohei Motegi, both of Yokohama, all of Japan
[73] Assignee: Tokyo Keiki Co., Ltd., Tokyo, Japan
[22] Filed: June 4, 1973
[21] Appl. No.: 366,852

[30] Foreign Application Priority Data
June 7, 1972 Japan.............................. 47-56632

[52] U.S. Cl. ............................ 192/67 R, 192/84 C
[51] Int. Cl. ...................... F16d 11/04, F16d 27/10
[58] Field of Search ........................ 192/67 R, 84 C

[56] References Cited
UNITED STATES PATENTS
2,730,212 1/1956 Rice et al..................... 192/67 R X
FOREIGN PATENTS OR APPLICATIONS
892,027 6/1960 Great Britain.................. 192/67 R Primary Examiner—Allan D. Herrmann
Attorney, Agent, or Firm—Robert Osann

[57] ABSTRACT

A dog clutch has a first member with a plurality of dogs on one side and a fork-shaped second member with a plurality of dogs on one side. These two members are mounted on a common shaft in a facing relationship. Three engaging rolls are rotatably supported on an interposer capable of sliding along the axis. When the interposer is permitted to slide from a clutch disengaging position to a clutch engaging position by an electromagnet, some of the rolls engage the dogs of the first member while the remaining rolls engage the dogs of the second member, thereby effecting clutch engagement.

4 Claims, 11 Drawing Figures

DOG CLUTCH

This invention relates to a dog clutch and more particularly to improvements in a dog clutch having a first rotatable disk member, a second member coaxially mounted in an opposed relationship thereto, and a plurality of dogs mounted on the respective mutually opposing surfaces of the first and second members thereby effecting clutch engagement.

The construction of a typical prior art dog clutch is shown in FIG. 1. In more detail, a driven main shaft 1 is rotatably supported by ball bearings 2, 3. The shaft 1 is inserted in first and second members 4, 5 substantially in the form of disks. The first member 4 constituting a driving part of the clutch is freely rotatable on the shaft 1 and the second member 5 constituting a driven part of the clutch is capable of rotating together with the shaft 1 in the rotating direction. The second member 5 is inserted in a spline shaft 1a incorporated in the shaft 1 so as to relatively slide in the axial direction. A plurality of dogs 4a, 5a are mounted on the mutually opposed surfaces of the two members 4, 5. When the second member 5 is in a clutch disengaging position shown in FIG. 1, the dogs 4a, 5a of the two members 4, 5 are incapable of engaging with each other. Therefore, the transmission of rotation between the two members 4, 5 cannot be effected. If the second member 5 slides to the right (in the figure) up to a clutch engaging position, however, the transmission of rotation between the two will become possible. Consequently, if a gear 6 fixedly attached to the first member 4 is rotated by power from a drive source such as a motor (not shown), then the main shaft 1 will be rotated in the clutch engaging position through the first member 4 and the second member 5.

However, this type of conventional dog clutch had the serious drawbacks that, in transmitting rotation, a contact pressure was applied not only on contact surfaces of the dogs 4a, 5a of the two members 4, 5 but also on the contact surface of the second member 5 and the spline shaft 1a. This formed when the clutch engagement and disengagement were to be effected by sliding the second member 5 on the shaft in its axial direction.

In greater detail, high frictional resistance was produced on the surfaces under contact pressure so that facile and high speed clutch engagement and disengagement were impossible. Since a large external axial force was required for clutch engagement and disengagement, remote control or automatic control was difficult. A large electromagnet was needed to produce such great force, resulting in a larger clutch body, a higher manufacturing cost, and less mechanical durability, less facile operation, less speedy operation, etc.

The dog clutch of the invention has first and second rotatable members each having a plurality of dogs. These two members are mounted substantially on a common shaft and axially in relatively fixed positions. An interposer cooperating with the first and second members is disposed on the shaft so as to be rotatable thereon and slidable in the axial direction. A plurality of engaging rolls are supported side by side on a shaft carried by the interposer. Some of the engaging rolls rotate in the same way, whereas the other may rotate in a different way. When the interposer slides from the clutch disengaging position, some of the engaging rolls engage the dogs of the first member while the remaining rolls engage the dogs of the second member whereby rotation transmission between the two members is effected to achieve clutch engagement. The sliding movement of the interposer for performing clutch engagement and disengagement is, for example, conducted by an electromagnet capable of remote control or automatic control. The friction surfaces on which the engaging rolls engage the dogs of the two members may be inclined. The disengagement of the interposer from the dogs becomes easier due to the camming action against the inclined surfaces. Furthermore, it can serve well as a torque limiter to secure safety against the overload.

Accordingly, an object of this invention is to provide a dog clutch capable of easy and speedy operation without requiring a large external force for clutch engagement and disengagement.

Another object of the invention is to provide a small-size, low cost and high-durability dog clutch.

A further object of the invention is to provide a dog clutch suitable for clutch engagement and disengagement by remote control and for incorporation into an automatic control system.

A still further object of the invention is to provide a dog clutch capable of accurately performing the function of a torque limiter.

A still further object of the invention will be readily understood from the contents of the embodiments described below together with the accompanying drawings, FIG. 1 is a longitudinal sectional view showing a typical conventional dog clutch;

FIG. 2A is a sectional view taken along line A—A of FIG. 2B; and FIG. 2B is a sectional view taken along the line B—B of FIG. 2A;

FIG. 4A is a sectional view taken along the line A—A of FIG. 4B; and FIG. 4B is a sectional view taken along the line B—B of FIG. 4A;

Figure 2A:
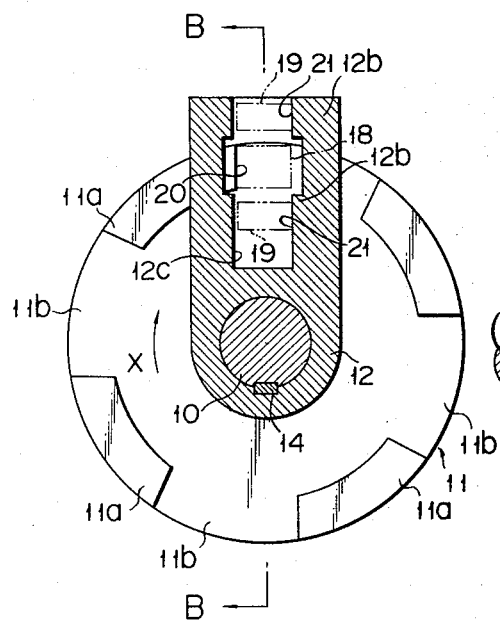
FIG. 2A and 2B illustrate a dog clutch as the first embodiment of the invention.
Figure 2B:
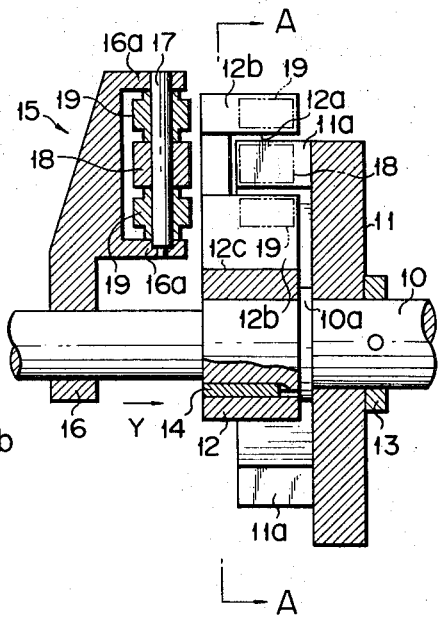

Referring now to FIGS. 2A and 2B, first and second members 11, 12 are held on a main shaft 10 in a closely opposing relationship with each other, said main shaft having both ends rotatably supported by bearings (not shown). The first member 11 is interposed between a stepped flange 10a of the main shaft 10 and a ring 13 fixed to the main shaft 10, so that the member is incapable of axial movement, but is capable of freely rotating on the main shaft 10. The first member 11 is connected to a power supply (not shown) through a suitable power transmission mechanism and continuously rotatable in the clockwise direction shown by the arrow X in FIG. 2A, thus constituting a driving part of the clutch. The first member 11 may also be used as a driven part of the clutch, as described below. A plurality of dogs 11a are formed integrally with first member 11 and are projected radially from one side thereof.

Four such dogs 11a are shown in the figure as being equally spaced along the circumference of the first member, although the number of the dogs used may be appropriately increased or decreased.

The second member 12 is fixedly attached to the main shaft 10 by a key 14, and rotatable with the main shaft 10. Consequently, the main shaft 10 is a driven shaft and the second member 12 forms a driven part of the clutch. A recess 12a is formed in one side of the second member 12 to define a passage through which the dogs 11a of the first member 11 may freely travel. In other words, the recess 12a is arranged on the circumference of the second member 12. A notch 12c is formed in the second member 12 so as to penetrate it in the axial direction so that the second member 12 is fork-shaped as shown in FIG. 2A. A pair of dogs 12b are disposed respectively at the inner and outer portions of the notch 12c. To obtain a balanced or even weight distribution, a suitable weight may be provided on the second member at a portion opposite to the notch 12c with respect to the main shaft 10, or the entire second member 12 may be formed in the form of a disk similar to the first member 11.

An interposer 15 has its stem 16 supported on the main shaft 10 in a position opposite to the first member 11 with respect to the second member 12. The stem 16 is slidable on the main shaft 10 in the axial direction thereof and rotatable thereon. The body of the interposer 15 which extends outwardly from the stem 16 with respect to the main shaft 10 is provided with a pair of spaced supporting arms 16a which extend in a direction parallel to the main shaft 10, and between which a shaft 17 is securely interposed. The shaft 17, therefore, lies perpendicular to a direction in which the interposer 15 is adapted to slide.

Said shaft 17 carries three engaging rolls 18, 19, 19 which are independently rotatable. In the embodiment illustrated, the roll 18 freely rotates on the shaft 17 whereas the rolls 19, 19 in both sides of the roll are fixedly attached to the shaft 17 rotatably carried by the supporting arms 16a. The roll 18 may be supported on the shaft 17 through an antifriction bearing. The engaging rolls 18, 19, 19 are normally in the position shown in FIG. 2B (hereinafter referred to as the disengaging position).

As the interposer 15 slides in the direction of arrow Y, it enters the notch 12c of the second member 12.

Figure 3A:
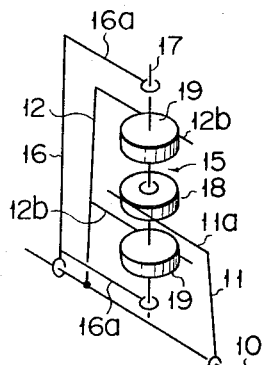
FIGS. 3A, 3B and 3C are schematic diagrams explaining as a model the operation of a dog clutch of the invention.
Figure 3B:
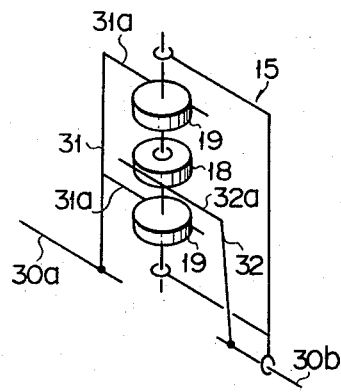
Figure 3C:
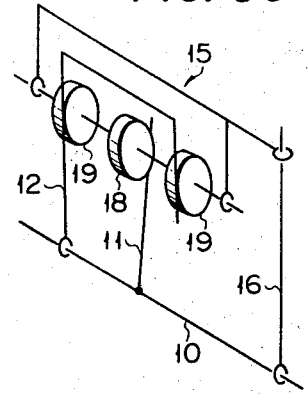

In the first embodiment of the above arrangement, when the interposer 15 slides in the direction of arrow Y to permit the rolls 18, 19, 19 to be introduced into the notch 12c of the second member 12 and assume positions as shown by chain-dot line in FIG. 2B (hereinafter referred to as the engaging position) while the first member 11, the driving part, is kept rotated in the arrow direction, the central roll 18 enters the recess 11b between the two neighboring dogs 11a of the rotating first member 11, and abuts on one side surface 20 of the dog 11a. On the other hand, the remaining rolls 19, 19 abut on the frictional surfaces 21, 21 of the inner and outer dogs 12b, 12b. The rotation of the first member 11 is thus transmitted to the second member 12 through the three engaging rolls 18, 19, 19 so that the second member 12 is rotated in the arrow direction X together with the interposer 15, thereby rotating the main shaft 10 in the same direction to effect clutch engagement. FIG. 3A shows the principle of the first embodiment. This clearly shows that the three rolls 18, 19, 19 are arranged in the direction perpendicular to that of sliding movement of the interposer 15 for clutch engagement and disengagement. It is essential that some of the rolls engage the dogs 11a of the first member and the other rolls engage the dogs 12b of the second member. So long as these conditions are met, the device may be modified. The interposer 15 need not always slide in the axial direction of the main shaft 10. FIG. 3C shows the principle of an example, in which clutch engagement and disengagement are effected by moving the interposer 15 along the radius of the main shaft 10. With such construction, the same function as in FIG. 3A can be performed. Still another modification will be described later.

In the first embodiment so constructed, the first and second members 11 and 12 are indirectly engaged through the three rolls 18, 19 19 on the interposer 15 without direct engagement. The manner of abutting engagement of these rolls with the dogs of the two members 11, 12 is a so-called antifriction contact. Since the roll 18 rotates independently of the rolls 19, 19, no sliding friction is produced on the contact surface in the engagement and disengagement of the interposer 15. No force such as torsional moment is exerted between the interposer 15 and the main shaft 10.

Figure 1:
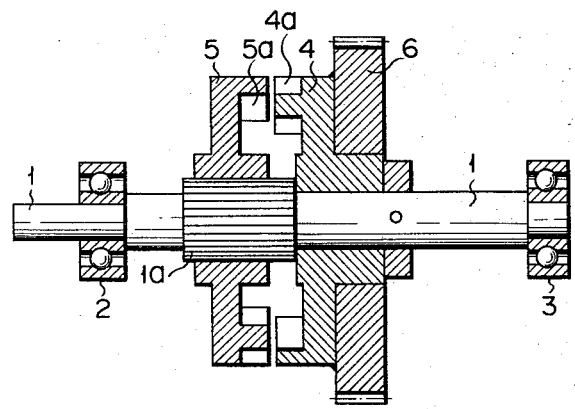

The conventional construction of FIG. 1, when effecting clutch engagement and disengagement, produced a strong sliding friction in the contact surfaces of dogs 4a, 5a or in the engagement portion of spline shaft 1a and second member 5.

In this embodiment, however, these sliding frictions are substituted with a rolling friction produced in the contact surfaces of three rolls 18, 19, 19 and dogs and the sliding friction caused by rotation between three rolls and shaft 17 or between shaft 17 and supporting arm 16a. This embodiment remains substantially unaffected by the sliding friction described above because the diameter of shaft 17 is considerably small as compared with that of each roll. In addition, these sliding frictions are negligibly small when a ball bearing is applied between each roll and shaft 17 or between shaft 17 and supporting arm 16a. Thus the clutch engagement and disengagement can be promoted with greater ease and at higher speed. A small amount of external force will suffice to cause the sliding of the interposer. Furthermore, the mechanical durability of the clutch can be improved.

Figure 4A:
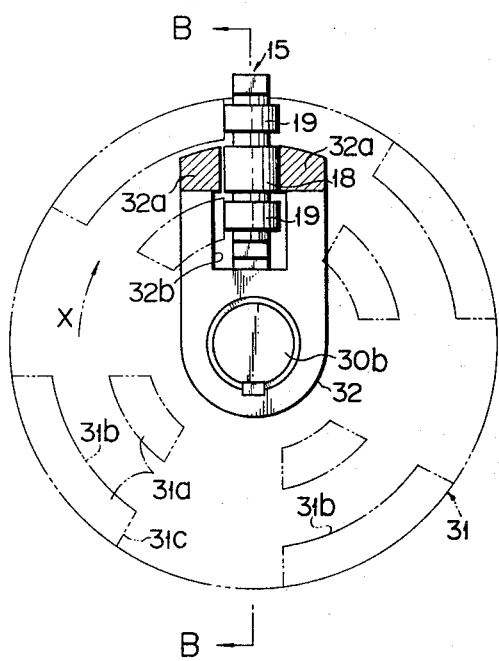
FIGS. 4A and 4B illustrate another dog clutch as the second embodiment of the invention.
Figure 4B:
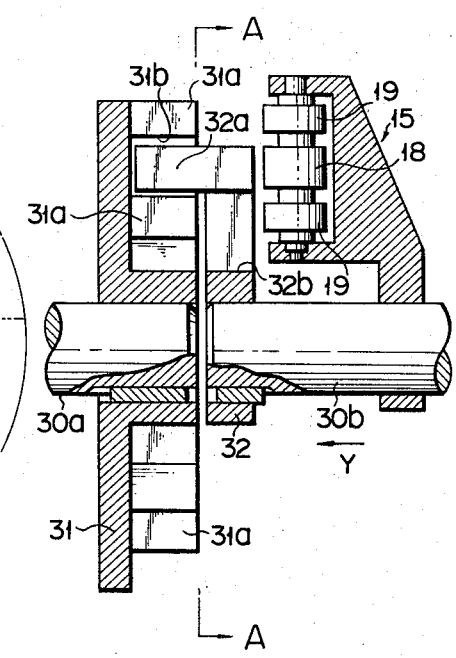

In a second embodiment of the invention shown in FIGS. 4A and 4B, two main shafts 30a, 30b are spacedly aligned. One of the two main shafts, say 30a, is a driving shaft whereas the other shaft 30b is a driven shaft. A first disk member 31 constituting a driving part of the clutch is mounted on the main shaft 30a and fixedly secured thereto by a key so as to continuously rotate in the arrow direction X. A second member 32 constituting a driven part of the clutch is fixed on the shaft 30b so as to act as a single unit.

A plurality of dogs 31a are arranged on one side of the first member 31, as shown in FIG. 4A. One group thereof is disposed on the outer circumference to extend in the axial direction and the other group on the same circumference between the outer circumference and the central axis so as to extend in the axial direction. The dogs 31a of the outer group and those of the inner group respectively define recesses 31b in which dogs 32a formed in the upper end portion of the second member 32 so as to extend in the axial direction freely pass in the rotational direction. Recesses 31c are defined between the neighboring dogs 31a of the first member 31. As shown in FIG. 4A, the second member 32 is in the form of a fork having two legs extending upwardly (in the figure) and defining therebetween a notch section 32b open in the axial direction.

An interposer 15 having a construction similar to that of the first embodiment is disposed slidably along the axis and rotatably with respect to the shaft 30b, said interposer 15 carrying three engaging rolls 18, 19, 19. As the interposer 15 slides in the arrow direction Y, the three rolls 18, 19, 19 enter the notch section 32b of the second member and enter the recess 31c of the first member, whereby the engaging roll 18 abuts against the dog 32a of the second member while the other rolls 19, 19 abut against the dogs 31a of the first member, thereby effecting clutch engagement and rotation transmission from the driving main shaft 30a to the driven main shaft 30b through the first member 31, engaging rolls 18, 19, 19, and second member 32. FIG. 3B shows the principle of this construction. The second embodiment, like the first embodiment, displays an unprecedentedly marked effect not found in the prior art arrangement.

In the second embodiment, the interposer 15 is mounted on the opposite side of the first member 31 with respect to the second member 32. It is possible to design, however, that the interposer 15 slide on the main shaft 30b between the two members 31, 32.

Figure 5:
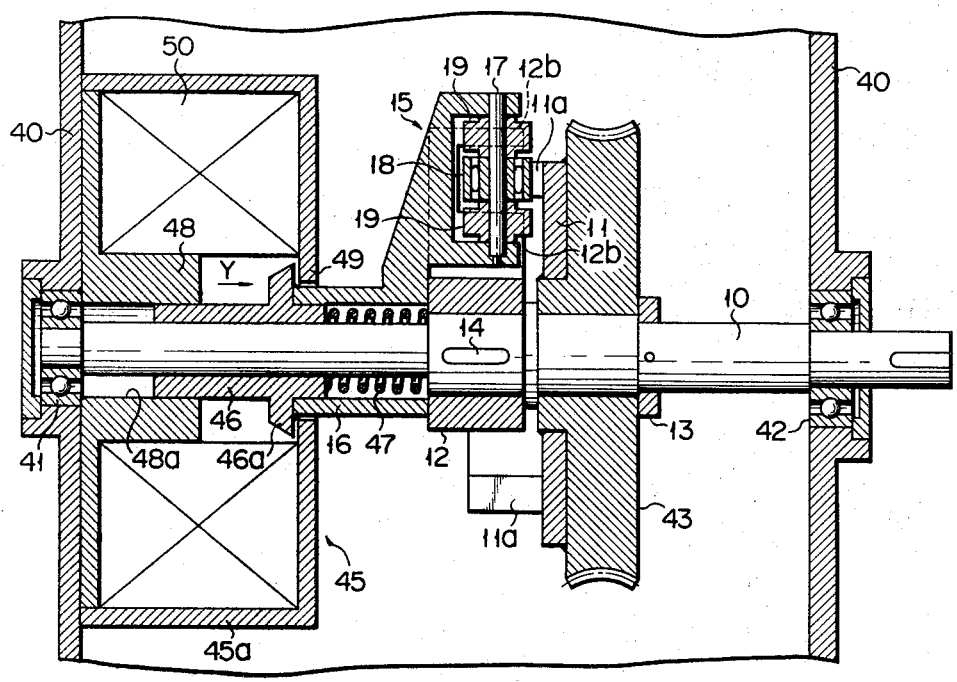
FIG. 5 is a longitudinal sectional view showing still another dog clutch (the third embodiment of the invention) which operates the interposer by an electromagnet.

A further embodiment of the invention shown in FIG. 5 effects clutch engagement and disengagement by moving the interposer by the action of an electromagnet in a clutch having substantially the same construction as the dog clutch indicated in FIGS. 2A and 2B. Throughout FIGS. 2 and 5, like numerals designate like parts for the sake of clarity.

The main shaft 10 is made of substantially nonmagnetic material, such as stainless steel 18–8 and has both ends rotatably supported on a clutch-box 40 through bearings 41, 42. A worm wheel 43 rotatably mounted on the main shaft 10 is connected through a worm (not shown) meshing therewith to a motor (not shown), and is continuously unidirectionally rotated upon energization of the motor. The first disk member 11 having dogs 11a is fixedly attached by a suitable means to one side of the worm wheel 43. If desired the dogs may be formed directly on the worm wheel 43. The fork-shaped second member 12 is fixedly attached by a key 14 to the main shaft 10 as a single unit, and faces the first member 11 with a small spacing. The stem 16 of the interposer 15 is made cylindrical and formed of a nonmagnetic material, such as, a copper alloy or an aluminum alloy and carried by the main shaft 10.

To the end of the stem 16 is integrally connected a movable cylindrical ironpiece 46 of an electromagnet 45. The movable ironpiece 46 is freely mounted on the main shaft 10 and the ironpiece 46 is slidable on the shaft 10. Within the stem 16 of the interposer 15, a compression coil spring 47 is disposed around the main shaft 10 in such a way that the interposer 15 is normally urged by the spring 47 in the disengaging position which is leftwardly of the engaging position shown in FIG. 5.

Three engaging rolls 18, 19, 19 are supported on the shaft 17 of the interposer 15. The rolls 19, 19 are fixedly attached to the shaft 17 whereas the roll 18 is rotatably supported thereon through a needle bearing.

The second member 12 of the third embodiment, like that of the first embodiment, has recesses permitting the free passage of dogs 11a of the first member and a pair of dogs 12b disposed vertically. These dogs are mostly shown dotted because they are behind the engaging rolls 18, 19, 19 on the interposer 15 in the engaging position shown. When the interposer 15 is in the engaging position, the rolls 19, 19 abut against the dogs 12b of the second member while the roll 18 abuts against the dogs of the first member, thereby effecting clutch engagement as in the first embodiment.

The movable ironpiece 46 has its end axially slidably received by a hole 48a perforated in a center magnetic pole coaxial with the main shaft 10. When the interposer 15 is in the engaging position, the flange 46a of the ironpiece 46 is slightly spaced from the other magnetic pole 49 in the axial direction. A yoke 45a which magnetically couples the two magnetic poles 48, 49 is fixedly attached to a clutch-box 40. A coil 50 is disposed within the yoke 45a. The movable ironpiece 46, magnetic poles 48, 49 and yoke 45a are all made of magnetic material having a small coercive force, such as soft iron or soft steel. The york 45a may be made integral with the clutch-box 40.

When the electromagnet 45 is excited by conduction of the coil 50, the ironpiece 46 is moved along the axis in the arrow direction Y against the action of the coil spring 47, thereby sliding the interposer 15 up to the engageing position shown in FIG. 5 and effecting clutch engagement. Rotation, when afforded to the worm wheel 43 by motor, is transmitted to the main shaft 10 through the first member 11, three rolls 18, 19, 19, and second member 12.

If the coil 50 is deenergized, however, the ironpiece 46 will be moved by the action of the coil spring 47 in a direction opposite to the arrow direction Y, thereby permitting the interposer 15 to return to the disengaging position and causing clutch disengagement. As a result, the transmission of rotation from the worm wheel 43 to the main shaft 10 is nullified. The third embodiment, like the foregoing embodiments, can save the force required to effect clutch engagement and disengagement by sliding the interposer 15 on the main shaft 10. Accordingly, even a weak coil spring and small-size electromagnet are available for this purpose. Thus the dog clutch of the invention is well adapted for the remote control of an electromagnet 45 and for the control of the electromagnet incorporated into an automatic control system.

Figure 6A:
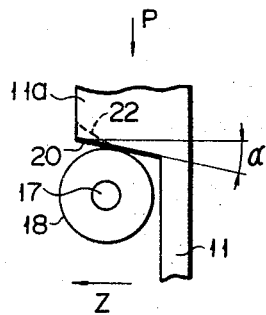
FIGS. 6A and 6B are explanations of the principal parts including a partial modification in which the engaging roll engages the dog on the inclined contact surfaces.

FIG. 6A illustrates a modification of the first embodiment in which the surface 20 contacting the engaging roll 18 of a dog 11a of the first member 11 is inclined at an angle a with respect to the direction (shown by the arrow Z) in which the interposer 15 approaches the disengaging position. With the contact surface 20 so inclined, a force component P sin $\alpha$ is produced along the contact surface 20 in the arrow direction Z by a force P transmitting from the dog 11a to the roll 18 in the rotating direction of the main shaft. If the value of a is properly selected, the coil spring 47 is no longer needed to return the interposer as shown in FIG. 5. In more detail, the contact surface 20 performs the so-called camming action against the roll 18 due to the production of the force component P sin α. If the force required to push the interposer in the direction of engagement is removed, then the roll 18 will be automatically disengaged from the dog 11a due to the camming action.

Figure 6B:
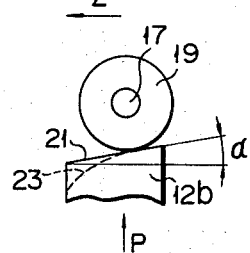

A similar effect can be produced by forming a suitably inclined contact surface 21 between the dog 12b of the second member 12 and the roll 19, as shown in FIG. 6B. It follows that any given inclined surface may be formed on one of the two contact surfaces 20, 21 or both. With the contact surfaces 20, 21 curved as shown by the curved line 22 or 23 in FIGS. 6A, 6B, a more effective camming action will be obtained.

In addition, the following effect can be produced with the contact surface inclined as indicated in FIGS. 6A and 6B. When the roll 18 or 19 is made to move a predetermined distance in the disengaging direction Z, the function of a torque limiter can be afforded to the clutch by mounting a normally closed switch working with the roll. In greater detail, when the associated parts of the rolls 18, 19 corresponding to the driven parts abruptly cease to rotate for some reason or other, the roll 18 or 19 can be pushed on in the disengaging direction against the energized force applied to the roll in the engaging direction, thereby opening the motor switch to disconnect the motor as a drive source, and preventing the motor and related parts from receiving overload and from inflicting damage on them.

In summary, this invention can provide an excellent dog clutch suitable for remote control or automatic control with less external force required for clutch engagement and disengagement and capable of easy and speedy operation. It is also fit for various uses because of the compactness of the clutch in construction. Furthermore, it is also functionally excellent since it can serve well as a torque limiter.

What we claim is:

1. A dog clutch comprising in combination,
   a. a first member and a second member each capable of rotating around an axis and having a fixed position relative to each other in its axial direction and having a plurality of dogs;
   b. a plurality of recesses formed circumferentially in one of said members so as to permit the dogs of the other member to freely pass through said recesses while the two members are rotating relative to each other;
   c. an interposer capable of shifting straight between a clutch engaging position and a clutch disengaging position;
   d. a notch penetrating one of said members in the shifting direction of said interposer;
   e. a shaft passing through said interposer in a direction perpendicular to the shifting direction of the interposer; and
   f. a plurality of engaging rolls supported rotatably on said shaft so as to cause said rolls to enter said notch section when said interposer shifts from the clutch disengaging position to the clutch engaging position;
   g. some of said engaging rolls engaging the dogs of said first member and the remaining rolls engaging the dogs of said second member in the clutch engaging position, thereby effecting clutch engagement and rotation transmission from one of said two members to the other;
   h. said some of engaging rolls capable of relatively rotating around the shaft, independently of said remaining rolls.

2. A dog clutch according to claim 1, wherein said dog clutch has three engaging rolls supported on said shaft in series, the center roll of said three rolls rotating on the shaft through a bearing, the other two rolls being fixedly attached to the shaft having two end portions rotatably supported on a pair of arms formed in said interposer.

3. A dog clutch according to claim 1, wherein one end portion of said interposer is fixedly attached to a movable ironpiece of an electromagnet and said interposer moves from the clutch disengaging position to the clutch engaging position by excitation of said electromagnet.

4. A dog clutch according to claim 1, wherein at least one of the contact surfaces of dogs formed in the first member engaging said engaging roll and formed in the second member is an inclined surface to cam out the interposer from engagement with the dogs and to effect automatic clutch disengagement.

* * * * *